United States Patent [19]

Boeckh et al.

[11] Patent Number: 4,925,905

[45] Date of Patent: May 15, 1990

[54] PREPARATION OF WATER-SOLUBLE COPOLYMERS BASED ON MONOETHYLENICALLY UNSATURATED CARBOXYLIC ACIDS

[75] Inventors: Dieter Boeckh, Limburgerhof; Hans-Peter Seelmann-Eggebert, Schriesheim; Heinrich Hartmann, Limburgerhof; Wolfgang Trieselt, Ludwigshafen; Richard Baur, Mutterstadt, all of Fed. Rep. of Germany

[73] Assignee: BASF Aktiengesellschaft, Ludwigshafen, Fed. Rep. of Germany

[21] Appl. No.: 330,759

[22] Filed: Mar. 30, 1989

[30] Foreign Application Priority Data

Apr. 14, 1988 [DE] Fed. Rep. of Germany ....... 3812402

[51] Int. Cl.$^5$ ............................ C08F 2/14; C08F 6/10; C08F 220/06; C08F 220/28
[52] U.S. Cl. ..................... 526/208; 526/214; 526/220; 526/224; 526/318.43
[58] Field of Search ............. 526/318.43, 208, 214, 526/220, 224

[56] References Cited

U.S. PATENT DOCUMENTS

| | | |
|---|---|---|
| 3,925,329 | 12/1975 | Heinrich et al. ............... 526/318.43 |
| 4,027,082 | 5/1977 | Gavvilova et al. ............ 526/318.43 |
| 4,351,922 | 9/1982 | Yoshida et al. ................ 526/318.43 |
| 4,794,139 | 12/1988 | Baden et al. .................... 526/318.43 |

FOREIGN PATENT DOCUMENTS 62-27410 2/1987 Japan .............................. 526/318.43

*Primary Examiner*—Joseph L. Schofer
*Assistant Examiner*—N. Sarofim
*Attorney, Agent, or Firm*—Oblon, Spivak, McClelland, Maier & Neustadt

[57] ABSTRACT

Water-soluble copolymers having a K value of from 8 to 100 (determined on the Na salt of the copolymers according to H. Fikentscher in aqueous solution at 25° C., at a pH of 7 and at a concentration of the Na salt of the polymer of 1% by weight) are prepared by copolymerization of monomer mixtures of (a) from 98.5 to 18.5 mol % of one or more monoethylenically unsaturated $C_3$-$C_6$-monocarboxylic acids,
(b) from 1.5 to 20 mol % of one or more comonomers which contain two or more ethylenically unsaturated, nonconjugated double bonds which are separated from one another by one or more ester bonds,
(c) from 0 to 80 mol % of one or more monoethylenically unsaturated $C_4$-$C_6$-dicarboxylic acids or their anhydrides and
(d) from 0 to 20 mol % of other monoethylenically unsaturated comonomers which are copolymerizable with the monomers (a), (b) and (c), the sum of the molar percentages (a) to (d) always being 100, in the presence of a polymerization initiator and a polymerization regulator at not more than 200° C. in one or more inert organic solvents.

13 Claims, No Drawings

PREPARATION OF WATER-SOLUBLE COPOLYMERS BASED ON MONOETHYLENICALLY UNSATURATED CARBOXYLIC ACIDS

U.S. patent application Ser. No. 07/191,979 now U.S. Pat. No. 4,897,220 describes water-soluble copolymers which contain, as copolymerized units,
(a) from 99.5 to 15 mol % of one or more monoethylenically unsaturated $C_3$–$C_6$-monocarboxylic acids,
(b) from 0.5 to 20 mol % of one or more comonomers which possess two or more ethylenically unsaturated, non-conjugated double bonds and have one or more —CO—OX groups, where X is one equivalent of hydrogen, of an alkali metal or of an alkaline earth metal or ammonium,
(c) from 0 to 84.5 mol % of one or more monoethylenically unsaturated $C_4$–$C_6$-dicarboxylic acids,
(d) from 0 to 20 mol % of one or more hydroxyalkyl esters of monoethylenically unsaturated $C_3$–$C_6$-carboxylic acids, where the hydroxyalkyl group is of 2 to 6 carbon atoms, and
(e) from 0 to 30 mol % of other water-soluble, monoethylenically unsaturated monomers which are copolymerizable with (a), (b), (c) and (d),
with the proviso that the sum of the molar percentages (a) to (e) is always 100, and which have a K value of from 8 to 120 (determined on the Na salt of the copolymers according to H. Fikentscher in aqueous solution at 25° C., at a pH of 7 and at a concentration of the Na salt of the polymer of 1% by weight).

The copolymers are added in amounts of not more than 25, preferably from 2 to 10, % by weight to detergent and cleaner mixtures.

U.S. patent application Ser. No. 07/191,898 now U.S. Pat. No. 4,897,215 describes water-soluble copolymers which contain, as copolymerized units,
(a) from 99.5 to 15 mol % of one or more monoethylenically unsaturated $C_3$–$C_6$-monocarboxylic acids,
(b) from 0.5 to 20 mol % of one or more comonomers which possess two or more ethylenically unsaturated, non-conjugated double bonds and are derived from esters which are obtainable by esterification of
(b1) monoethylenically unsaturated $C_3$–$C_6$-monocarboxylic acids with
(b2) polyhydric alcohols of 2 to 6 carbon atoms, water-soluble or water-insoluble polyalkylene glycols having a molecular weight of up to about 400, water-soluble polyalkylene glycols having a molecular weight from more than about 400 to 10,000, polyglycerols having a molecular weight of up to 2,000, polyvinyl alcohol having a molecular weight of up to 10,000 and monohydric, monoethylenically unsaturated $C_3$–$C_6$-alcohols,
(c) from 0 to 84.5 mol % of one or more monoethylenically unsaturated $C_4$–$C_6$-dicarboxylic acids,
(d) from 0 to 20 mol % of one or more hydroxyalkyl esters of monoethylenically unsaturated $C_3$–$C_6$-carboxylic acids, where the hydroxyalkyl group is of 2 to 6 carbon atoms, and
(e) from 0 to 30 mol % of other water-soluble, monoethylenically unsaturated monomers which are copolymerizable with (a), (b), (c) and (d),
with the proviso that the sum of the molar percentages (a) to (e) is always 100, and which have a K value of from 8 to 120 (determined on the Na salt of the copolymers according to H. Fikentscher in aqueous solution at 25° C., at a pH of 7 and at a concentration of the Na salt of the polymer of 1% by weight).

Copolymers of this type are used in amounts of from 0.5 to 25, preferably from 1 to 15, % by weight in detergent and cleaner formulations. The copolymers described in the two abovementioned patent applications are prepared exclusively by copolymerization of the monomers in an aqueous medium.

It is an object of the present invention to modify the properties of the copolymers disclosed in the abovementioned patent applications.

We have found that this object is achieved, according to the invention, by a process for the preparation of water-soluble copolymers based on mono-ethylenically unsaturated carboxylic acids, having K values of from 8 to 100 (determined on the Na salt of the copolymers according to H. Fikentscher in aqueous solu-tion at 25° C., at a pH of 7 and at a concentration of the Na salt of the polymer of 1% by weight), by copolymerization of a monomer mixture of
(a) from 98.5 to 18.5 mol % of one or more monethylenically unsaturated $C_3$–$C_6$-monocarboxylic acids,
(b) from 1.5 to 20 mol % of one or more comonomers which contain two or more ethylenically unsaturated, non-conjugated double bonds which are separated from one another by one or more ester bonds,
(c) from 0 to 80 mol % of one or more monoethylenically unsaturated $C_4$–$C_6$-dicarboxylic acids or anhydrides of monoethylenically unsaturated dicarboxylic acids and
(d) from 0 to 20 mol % of other monoethylenically unsaturated comonomers which are copolymerizable with the monomers (a), (b) and (c),
the sum of the molar percentages (a) to (d) always being 100, in the presence of a polymerization initiator and a polymerization regulator at not more than 200° C., if the copolymerization is carried out in one or more inert organic solvents. Particularly suitable inert organic solvents are ethers, carboxylic esters, hydrocarbons, halohydrocarbons, saturated aliphatic ketones and alcohols, with the proviso that they are only suitable solvents when the comonomers (b) used are dicarboxylic acids and not dicarboxylic anhydrides. However, if modification of the dicarboxylic anhydrides is intended at as early a stage as during the copolymerization, the copolymerization of dicarboxylic anhydrides can also be carried out in the presence of alcohols.

Suitable components (a) of the monomer mixture for the preparation of the water-soluble copolymers are monoethylenically unsaturated $C_3$–$C_6$-monocarboxylic acids, for example acrylic acid, methacrylic acid, ethacrylic acid, vinylacetic acid, allylacetic acid and crotonic acid. Preferably used monomers of component (a) are acrylic acid and/or methacrylic acid. The monomers of component (a) are present in the copolymers in an amount of from 98.5 to 18.5, preferably from 98.5 to 35, mol %.

Suitable components (b) for the monomer mixtures for the preparation of the copolymers are comonomers which contain two or more ethylenically unsaturated, non-conjugated double bonds. The comonomers of group (b) are obtainable, for example, by reacting
(b1) maleic anhydride, itaconic anhydride, citraconic anhydride or a mixture of these with
(b2) a polyhydric alcohol of 2 to 6 carbon atoms, a polyalkylene glycol having a molecular weight of up to 10,000, a polyglycerol having a molecular weight of up to 2,000, an aminoalcohol, a hydroxyamino- or -diaminocarboxylic acid, in particular lysine or serine, a water-soluble copolymer of ethylene oxide and carbon dioxide, allyl alcohol, a hydroxyalkyl ester of a monoethylenically unsaturated $C_3$–$C_6$-carboxylic acid or of a saturated $C_3$–$C_6$-hydroxycarboxylic acid, where the hydroxyalkyl group is of 2 to 6 carbon atoms, or a mixture of these.

Polyhydric alcohols of 2 to 6 carbon atoms are, for example, glycol, glycerol, pentaerythritol and monosaccharides, such as glucose, mannose, galactose, uronic acids, such as galacturonic acid, and sugar acids, such as mucic acid or galactonic acid.

Polyalkylene glycols having molecular weights of up to 10,000 are the adducts of ethylene oxide, propylene oxide, n-butylene oxide and isobutylene oxide, or a mixture of these, with polyhydric alcohols of 2 to 6 carbon atoms, for example the adducts of ethylene oxide with glycol, adducts of ethylene oxide with glycerol, adducts of ethylene oxide with pentaerythritol or sorbitol, adducts of ethylene oxide with monosaccharides, and the adducts of mixtures of the stated alkylene oxides with polyhydric alcohols. These adducts may be block copolymers of ethylene oxide and propylene oxide, of ethylene oxide and butylene oxide or of ethylene oxide, propylene oxide and butylene oxides. In addition to the block copolymers, adducts which contain the stated alkylene oxides randomly copolymerized are suitable. The molecular weight of the polyalkylene glycols is advantageously up to 5,000, preferably up to 2,000. Among the water-soluble polyalkylene glycols, diethylene glycol, triethylene glycol, tetraethylene glycol and polyethylene glycols having a molecular weight of up to 1,500 are preferably used.

Other suitable components (b2) are polyglycerols having a molecular weight of up to 2,000. From this class of substances, diglycerol, triglycerol and tetraglycerol are preferably used.

Further suitable components (b2) are amino-alcohols, such as ethanolamine, 2-aminopropan-1-ol, neopentanolamine and 1-methylamino-2-propanol.

Suitable components (b2) are, furthermore, copolymers of ethylene oxide and carbon dioxide, which are obtainable by copolymerization of ethylene oxide and carbon dioxide. Other suitable compounds for component (b2) are lysine, serine and hydroxyalkyl esters of monoethylenically unsaturated $C_3$–$C_6$-mono- and dicarboxylic acids, where the hydroxyalkyl group is of 2 to 6 carbon atoms.

The hydroxyalkyl ester groups of the last-mentioned monomers are derived from polyhydric alcohols, eg. glycol, glycerol, propane-1,2-diol, propane-1,3-diol, butane-1,4-diol, butane-1,3-diol, butane-2,3-diol, mixtures of the butanediols or propanediols, hexane-1,6-diol and neopentylglycol. The polyhydric alcohols are esterified with monoethylenically unsaturated $C_3$–$C_6$-carboxylic acids. These are the carboxylic acids mentioned above under (a) and (c). Examples of suitable components (b2) are thus hydroxyethyl acrylate, hydroxyethyl methacrylate, hydroxy-n-propyl methacrylate, hydroxy-n-propyl acrylate, hydroxyisopropyl acrylate, hydroxyisopropyl methacrylate, hydroxy-n-butyl acrylate, hydroxyisobutyl acrylate, hydroxy-n-butyl methacrylate, hydroxyisobutyl methacrylate, hydroxyethyl monomaleate, hydroxyethyl dimaleate, hydroxypropyl monomaleate, hydroxypropyl dimaleate, hydroxy-n-butyl monomaleate, hydroxy-n-butyl dimaleate and hydroxyethyl monoitaconate. Among the hydroxyalkyl esters of the monoethylenically unsaturated dicarboxylic acids, both the monoesters and the diesters of the dicarboxylic acids with the abovementioned polyhydric alcohols are suitable.

Hydroxyalkyl esters of saturated $C_3$–$C_6$-hydroxycarboxylic acids, such as glycol monohydroxyacetate, glycol monolactate and neopentylglycol hydroxypivalate, are also suitable.

Comonomers (b) obtained from maleic anhydride and ethylene glycol, polyethylene glycol having a molecular weight of up to 2,000, glycerol, diglycerol, triglycerol, tetraglycerol and polyglycerols having a molecular weight of up to 2,000, pentaerythritol, monosaccharides, neopentylglycol, $\alpha, \omega$-diols of 3 to 6 carbon atoms and neopentylglycol monohydroxypivalate are preferably used.

Comonomers (b) which are derived from ethylene glycol and polyethylene glycol are, for example, of the following formula:

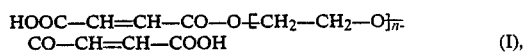

where n is from 1 to 50, preferably from 2 to 40.

2 or more OH groups of the hydroxyl-containing compounds stated under (b2) are esterified with an anhydride of component (b1). 1 mole of anhydride is used per mole of OH group in order to obtain the comonomers (b). The comonomers (b) contain two or more ethylenically unsaturated, nonconjugated double bonds and one or more C-O-OH groups, the double bonds being separated from one another by one or more ester bonds, ie. a group of the structure

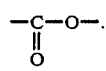

Other suitable comonomers (b) are compounds which possess two ethylenically unsaturated, nonconjugated double bonds and which are derived from esters which are obtainable by esterifying (b3) acrylic acid, methacrylic acid, crotonic acid, vinylacetic acid, methacrylic anhydride or a mixture of these with (b2) dihydric or polyhydric alcohols of 2 to 6 carbon atoms, polyalkylene glycols having a molecular weight of up to 10,000, polyglycerol having a molecular weight of up to 2,000, aminoalcohols, hydroxyamino- or hydroxydiaminocarboxylic acids, water-soluble copolymers of ethylene oxide and carbon dioxide, allyl alcohol, hydroxyalkyl esters of monoethylenically unsaturated $C_3$–$C_6$-carboxylic acids or of saturated $C_3$–$C_6$-hydroxycarboxylic acids, where the hydroxyalkyl group is of 2 to 6 carbon atoms, or a mixture of these.

In the esterification, the molar ratio of acid component to alcohol component, ie. (b3):(b2), is adjusted so that the resulting comonomers possess two or more ethylenically unsaturated, nonconjugated double bonds. For example, glycols and polyethylene glycols are reacted in a molar ratio of 1:2 with acrylic acid or methacrylic acid, while in the reaction of allyl alcohol with acrylic acid or methacrylic acid the molar ratio is 1:1.

In the case of the preparation described above, of the comonomers containing ester groups, instead of the free acids it is also possible to use their ester-forming derivatives, such as anhydrides, acyl halides or acid esters, in particular those with monohydric $C_1$–$C_3$-alcohols, as components (b3). A particularly suitable anhydride is methacrylic anhydride.

It is of course also possible to use mixtures of different comonomers of group (b). Of particular interest are copolymers in the preparation of which some of the comonomers (b) obtainable by reacting (b1) with (b2) are replaced by comonomers formed by reacting (b3) with (b2). In this mixture of monomers, the first-mentioned comonomers which can be prepared by reacting (b1) with (b2) are present in an amount of from 0 to 15 mol %. Comonomers of group (b) are present in the copolymer in polymerized form in amounts of from 1.5 to 20, preferably from 1.5 to 10, mol %.

Monoethylenically unsaturated $C_4$–$C_6$-dicarboxylic acids or their anhydrides are used as monomers of component (c). These compounds are, for example, maleic acid, itaconic acid, citraconic acid, mesaconic acid, fumaric acid and methylenemalonic acid and the known anhydrides thereof. Maleic acid, itaconic acid, maleic anhydride and itaconic anhydride are preferably used. The use of anhydrides is of particular interest since this gives copolymers which, according to their content of anhydride groups, are capable of undergoing further chemical reactions. The monomers of group (c) are copolymerized in the copolymers in an amount of from 0 to 80 mol %. If the monomers of group (c) are used in the preparation of copolymers, the preferred amount is from 5 to 50 mol %.

The copolymers may furthermore contain, as copolymerized units, up to 20 mol % of other monoethylenically unsaturated comonomers which are copolymerizable with the monomers (a), (b) and (c), the sum of the molar percentages (a) to (d) being 100 in each case. Examples of suitable comonomers are hydroxyalkyl esters of monoethylenically unsaturated $C_3$–$C_6$-carboxylic acids, where the hydroxyalkyl group is of 2 to 6 carbon atoms. The hydroxyalkyl ester groups of this group of monomers are derived from polyhydric alcohols, eg. glycol, glycerol, propane-1,2-diol, propane-1,3-diol, butane-1,4-diol, butane-1,3-diol, butane-2,3-diol, mixtures of butanediols or pentanediols, hexane-1,6-diol and neopentylglycol.

Polyhydric alcohols are esterified with monoethylenically unsaturated $C_3$–$C_6$-carboxylic acids. These are the carboxylic acids mentioned above under a). Suitable components (d) are thus, for example, hydroxyethyl acrylate, hydroxyethyl methacrylate, hydroxy-n-propyl methacrylate, hydroxy-n-propyl acrylate, hydroxyisopropyl acrylate, hydroxyisopropyl methacrylate, hydroxy-n-butyl acrylate, hydroxyisobutyl acrylate, hydroxy-n-butyl methacrylate, hydroxyisobutyl methacrylate, hydroxyethyl monomaleate, hydroxyethyl dimaleate, monohydroxypropyl maleate, dihydroxypropyl maleate, monohydroxy-n-butyl maleate, dihydroxy-n-butyl maleate and monohydroxyethyl itaconate. Among the hydroxyalkyl esters of the monoethylenically unsaturated dicarboxylic acids, both the monoesters and the diesters of the dicarboxylic acids with the abovementioned polyhydric alochols are suitable.

Hydroxyethyl acrylate, hydroxyethyl methacrylate, butane-1,4-diol monoacrylate and the industrial mixtures of hydroxypropyl acrylates are preferably used as component (d). The isomer mixtures of 2-hydroxy-1-propyl acrylate and 1-hydroxy-2-propyl acrylate are of particular industrial importance. These hydroxyalkyl acrylates are prepared by reacting acrylic acid with propylene oxide.

Examples of other suitable monomers (d) are acrylamide, methacrylamide, 2-acrylamido-2-methylpropanesulfonic acid, vinylsulfonic acid, allylsulfonic acid, vinylphosphonic acid, allylphosphonic acid, acrylonitrile, methacrylonitrile, dimethylaminoethyl acrylate, diethylaminoethyl acrylate, diethylaminoethyl methacrylate, N-vinylpyrrolidone, N-vinylformamide, N-vinylimidazole, N-vinylimidazoline, 1-vinyl-2-methyl-2-imidazoline and vinyl acetate, as well as mixtures of the stated monomers.

Those monomers of this group which contain acid groups are preferably used in the copolymerization in the form of the free acids. However, they can also be used in the copolymerization in partially neutralized form. The basic acrylates, such as diethylaminoethyl acrylate, are likewise preferably subjected to copolymerization in the non-neutralized or non-quaternized form.

The monomers of group (d) are present in the copolymer in polymerized form in amounts of from 0 to 20, preferably from 0 to 15, mol %. The sum of the molar percentages of components (a) to (d) is always 100. The copolymerization is carried out, according to the invention, in one or more inert organic solvents. It can be carried out by various methods; for example, the monomers (a) to (d) can be polymerized in the form of a solution in an inert organic solvent by a batchwise procedure. It is also possible first to take part of the monomers and part of the initiator in a polymerization reactor, to heat the mixture to the polymerization temperature under an inert gas atmosphere and then to add the remaining monomers and the initiator and, if necessary, inert organic solvent to the reactor as the polymerization progresses. Continuous polymerization in a cascade consisting of a plurality of reactors is also possible. The polymerization temperatures are from 20° to 200° C., preferably from 40° to 160° C. If the reaction is carried out at above the boiling point of the particular inert solvent or solvent mixture used, pressure-resistant apparatuses are required and the polymerization is then carried out under pressures of up to 25 bar.

In a preferred embodiment, a special comonomer (b) is first prepared by initially taking (b1) maleic anhydride, itaconic anhydride, citraconic anhydride or a mixture of these in a reactor and reacting it therein with the abovementioned compounds (b2) at from 50° to 200° C. This reaction is carried out in the absence of water, although small amounts of water do not present problems when an appropriate excess of the component (b1) is used. Instead of the compounds stated under (b1), it is, however, also possible to use the monoesters or diesters of these compounds with $C_1$–$C_4$-alcohols. In these cases, a transesterification is carried out and, preferably, the resulting $C_1$–$C_4$-alcohol is distilled off from the reaction mixture. If esters of component (b1) are used in the preparation of the comonomers (b), these esters are preferably dimethyl maleate, monomethyl maleate, dimethyl itaconate, monoisopropyl maleate and diisopropyl maleate. If necessary, conventional esterification catalysts may be concomitantly used.

Not less than 0.5 mole of a compound of component (b1) is used per mole of the compounds (b2). The temperature during the reaction is preferably from 50° to 150° C. The reaction is carried out until quantitative conversion of the component (b2) is obtained. Component (b1), which is usually used in excess, can remain in the reaction mixture after preparation of the comonomer is complete. In this case, the comonomer can be dissolved in a monoethylenically unsaturated $C_3-C_6$-monocarboxylic acid according to a) and then subjected to copolymerization together with the unconverted part of component (b1) and the other monomers. The unconverted part of component (b1) should then be regarded as component (c) of the monomer mixture.

Compounds which form free radicals, for example peroxides, hydroperoxides, peroxydisulfates, redox initiators and azo initiators, are used as polymerization initiators.

The initiators should preferably have a half-life of <3 hours at the selected polymerization temperatures. If, for example, prepolymerization is carried out at a low temperature and polymerization is completed at a higher temperature, it is advisable to employ two or more initiators. For example, the following initiators are suitable for the stated polymerization temperatures:

Temperature: 50°-60° C.:
Acetylcyclohexanesulfonyl peroxide, dicetyl peroxydicarbonate, dicyclohexyl peroxydicarbonate, di-2-ethylhexyl peroxydicarbonate, tert-butyl perneodecanoate or 2,2'-azobis-(4-methoxy-2,4-dimethylvaleronitrile)

Temperature: 70°-80° C.:
Tert-butyl perpivalate, dioctanoyl peroxide, dilauroyl peroxide or 2,2'-azobis-(2,4-dimethylvaleronitrile)

Temperature: 90°-100° C.:
Tert-butyl per-2-ethylhexanoate

Temperature: 110°-120° C.:
Bis-(tert-butylperoxy)-cyclohexane, tert-butyl peroxyisopropylcarbonate or tert-butyl peracetate Temperature: 130°-140° C.:
2,2'-Bis-(tert-butylperoxy)-butane, dicumyl peroxide, di-tert-amyl peroxide or di-tert-butyl peroxide Temperature: 150° C.:
p-Menthane hydroperoxide, pinane hydroperoxide, cumene hydroperoxide or tert-butyl hydroperoxide.

By concomitantly using redox coinitiators, for example benzoin, dimethylaniline or those complexes and salts of heavy metals, such as copper, cobalt, manganese, iron, nickel or chromium, which are soluble in organic solvents, the half lives of the stated peroxides, in particular of the hydroperoxides, can be reduced, so that, for example, tert-butyl hydroperoxide is effective in the presence of 5 ppm of copper(II) acetylacetonate at as low as 100° C.

Apparatuses which are suitable for the polymerization are conventional stirred kettles having anchor stirrers, paddle stirrers, impeller stirrers or multi-stage impulse countercurrent agitators. Apparatuses which permit direct isolation of the solid product after the polymerization, for example paddle dryers, are particularly suitable.

The initiators are used in amounts of from 0.1 to 15, preferably from 0.5 to 10, % by weight, based on the sum of the monomers used in the polymerization. Polymerization initiators can be added continuously or batchwise to the mixture to be polymerized, either together with the monomers or separately from these as a solution in an inert organic solvent.

The copolymerization is carried out in the presence of a regulator. Examples of suitable regulators are $C_1-C_4$-aldehydes, eg. formaldehyde, acetaldehyde, isobutyraldehyde, n-butyraldehyde and acrolein, formic acid, ammonium formate, hydroxylammonium salts, in particular hydroxylammonium sulfate, SH-containing compounds having up to 20 carbon atoms, such as thioglycollic acid, mercaptoalcohols, such as mercaptoethanol, mercaptopropanol, mercaptobutanols and mercaptohexanol, thioglycerol, $C_4-C_{20}$-alkyl mercaptans, mercaptolactic acid, mercaptosuccinic acid and cysteine. Where such highly effective regulators are used, they are employed in the copolymerization in amounts of from 0.2 to 25, preferably from 0.5 to 15, % by weight, based on the monomers. However, the function of the regulator may also be assumed by a solvent which has a regulating action. Highly regulating solvents are, for example, dioxane, tetrahydrofuran and secondary alcohols, such as isopropanol, sec-butanol and glycerol. These can either be the sole solvent or be added during the copolymerization in amounts of not less than 20% by weight, based on the monomers. It is of course also possible to use mixtures of regulators in the copolymerization, for example mixtures of dioxane or tetrahydrofuran or isopropanol with one or more of the above-mentioned highly effective regulators, such as mercaptoethanol or thioglycollic acid.

The copolymerization can be carried out, for example, as a precipitation polymerization in $C_1-C_3$-alkylbenzenes, aliphatic, acyclic $C_4-C_8$-ketones, chloro-$C_1-C_4$-alkanes or mixtures of these. In particular, the following inert organic solvents are suitable for the precipitation polymerization: benzene, toluene, p-xylene, m-xylene, o-xylene and industrial mixtures of these, ethylbenzene, diethylbenzene, methylethylbenzene, methylene chloride, 1,2-dichloroethane, 1,1-dichloroethane, 1,1,1-trichloroethane, 1,1,2-trichloroethane, perchloroethylene, 1,2-dichloropropane, butyl chloride, fluorohydrocarbons, 2-butanone, 3-pentanone and 3-hexanone.

The copolymerization can also be carried out as a solution polymerization in one or more ethers, such as dioxane, tetrahydrofuran, ethylene glycol dimethyl ether, ethylene glycol diethyl ether or diethylene glycol dimethyl ether, or in acetone, methyl ethyl ketone, cyclohexanone, methylglycol acetate, ethylglycol acetate or a monohydric $C_1-C_4$-alcohol, such as methanol, ethanol, isopropanol, n-butanol, sec-butanol or tert-butanol, or ethylene glycol. If the anhydrides of dicarboxylic acids are used as monomers of component (c), the copolymerization is preferably carried out in the absence of alcohols, so that copolymers having anhydride groups are formed, which are capable of undergoing further chemical reactions.

The copolymerization can also be carried out as a suspension polymerization in one or more aliphatic hydrocarbons. Examples of suitable aliphatic hydrocarbons as inert solvents or diluents for the copolymerization are pentane, hexane, heptane, octane, isooctane, cyclohexane, methylcyclohexane, dimethylcyclohexane, ethylcyclohexane, diethylcyclohexane and mixtures of these. All isomers of the suitable aliphatic hydrocarbons, or mixtures of these isomers, may be used.

In the precipitation and suspension polymerization, it is advantageous to carry out polymerization additionally in the presence of a protective colloid. Examples of suitable protective colloids for this purpose are copolymers of maleic anhydride with a vinyl alkyl ether where alkyl is of 1 to 20 carbon atoms, or copolymers of maleic anhydride and an olefin of 8 to 20 carbon atoms or its monoesters with $C_{10}-C_{20}$-alcohols or monoamides with $C_{10}-C_{20}$-amines. Polyalkyl vinyl ethers, where alkyl is of 1 to 20 carbon atoms, for example polymethyl, polyethyl and polyisobutyl vinyl ether, are also suitable. If a protective colloid is used in the copolymerization, the effective amounts are from 0.05 to 4% by weight, based on the monomers to be polymerized.

A monomer mixture of
(a) from 98.5 to 35 mol % of acrylic acid or methacrylic acid,
(b) from 1.5 to 15 mol % of a diacrylate or dimethacrylate of butane-1,4-diol, polypropylene glycol having a molecular weight of from 134 to 1,016, polyethylene glycol having a molecular weight of from 106 to about 6,000 (ie. polyethylene glycol containing from 2 to 140 ethylene oxide units), trimethylolpropane triacrylate or trimethylolpropane trimethacrylate and
(c) from 0 to 50 mol % of maleic anhydride
in tetrahydrofuran, dioxane or a mixture of these is preferably subjected to the copolymerization.

In this preferred embodiment of the process, the comonomers (b) used can be bismaleic half esters which are obtainable by reacting maleic anhydride with ethylene glycol, polyethylene glycol having a molecular weight of up to about 6,000, neopentylglycol or butane-1,4-diol in a molar ratio of 2:1.

The copolymerization gives either polymer solutions in an inert organic solvent which have a polymer content of up to 70% by weight, or gives polymer suspensions. Copolymerization of the monomers (a) to (d) can also be carried out in a very dilute organic solution, for example with a total monomer content of 1% by weight, but for economic reasons the copolymerization is carried out in such a way that not less than 20% strength by weight solutions or polymer suspensions are obtained. The copolymers can be isolated directly from the solutions or suspensions by removing the solvents. If the copolymerization is carried out by a suspension or precipitation polymerization method, the copolymers can be isolated from the resulting reaction mixtures by filtration or centrifuging. The reaction mixture can also be extracted with water or an aqueous alkali. If the solution polymerization process is used, the inert organic solvent is distilled off or the copolymer is precipitated by conversion into the alkali metal, ammonium or alkaline earth metal salt. The resulting copolymers are soluble in water, at least in the salt form, ie. as an alkali metal, ammonium or calcium salt. Compared with the copolymers of the same composition which are prepared in aqueous solution, the copolymers prepared in an organic solvent have improved dispersing power for calcium carbonate. The copolymers also have the property of scarcely forming any precipitates with calcium ions at low polymer concentrations. The copolymers thus obtained are also biodegradable. They have a K value of from 8 to 100, preferably from 10 to 70. The K values of the copolymers are determined in each case on the sodium salt in aqueous solution at 25° C., at a pH of 7 and at a concentration of the sodium salt of the copolymer of 1% by weight. If the copolymers are in the form of other salts or free acids, they must first be converted into the sodium salts before the K value is determined. If the copolymers in the form of the free acid are insoluble in water, they can be converted into a water-soluble form by partial or complete neutralization with sodium hydroxide solution, potassium hydroxide solution, ammonia or an amine. Copolymers or their alkali metal or ammonium salts which have a solubility of not less than 20 g/l of water at 20° C. are regarded as being water-soluble in the present context.

The copolymers described above are used as additives for detergents and cleaners. They may be added in powder form or as liquid formulations. The detergent and cleaner formulations are usually based on surfactants and, if required, builders. In the case of pure liquid detergents, builders are generally omitted. Examples of suitable surfactants are anionic surfactants, such as $C_8$–$C_{12}$-alkylbenzenesulfonates, $C_{12}$–$C_{16}$-alkanesulfonates, $C_{12}$–$C_{16}$-alkylsulfates, $C_{12}$–$C_{16}$-alkylsulfosuccinates and sulfated oxyethylated $C_{12}$–$C_{16}$-alkanols, and nonionic surfactants, such as $C_8$–$C_{12}$-alkylphenol oxyethylates, $C_{12}$–$C_{20}$-alkanol oxyalkylates, and block copolymers of ethylene oxide and propylene oxide. The terminal groups of the polyalkylene oxides can, if required, be blocked. This is to be understood as meaning that the free OH groups of the polyalkylene oxides can be etherified, esterified, acetylated and/or aminated. Another possible method of modification consists in reacting the free OH groups of the polyalkylene oxides with isocyanates.

The nonionic surfactants also include $C_4$–$C_{18}$-alkylglucosides and the oxyalkylated products obtainable therefrom by oxyalkylation, in particular those which can be prepared by reacting alkylglucosides with ethylene oxide. The surfactants which can be used in detergents may also be of a zwitterionic nature or may be soaps. The surfactants are generally present in the detergents and cleaners in an amount of from 2 to 50, preferably from 5 to 45, % by weight.

Builders present in the detergents and cleaners are, for example, phosphates, such as orthophosphate, pyrophosphate and especially pentasodium triphosphate, zeolites, sodium carbonate, polycarboxylic acids, nitrilotriacetic acid, citric acid, tartaric acid, the salts of the stated acids and monomeric, oligomeric or polymeric phosphonates. The individual substances are used in various amounts for the preparation of the detergent formulations, for example sodium carbonate in amounts of not more than 80%, phosphates in amounts of not more than 45%, zeolites in amounts of not more than 40%, nitrilotriacetic acid and phosphonates in amounts of not more than 10% and polycarboxylic acids in amounts of not more than 20%, based in each case on the weight of the substances and on the total detergent formulation. Because of the high level of environmental pollution which the use of phosphates entails, the content of phosphates in detergents and cleaners is increasingly being reduced, so that detergents now contain not more than 25% of phosphate or are even preferably phosphate-free.

The copolymers can also be used as additives for liquid detergents. Liquid detergents usually contain, as components, liquid or solid surfactants which are soluble or dispersible in the detergent formulation. Suitable surfactants for this purpose are the products which are also used in detergent powders, and liquid polyalkylene oxides and polyoxyalkylated compounds.

Detergent formulations may also contain corrosion inhibitors, such as silicates, as further additives. Examples of suitable silicates are sodium silicate, sodium disilicate and sodium metasilicate. The corrosion inhibitors may be present in the detergent and cleaner formulation in amounts of up to 25% by weight. Other conventional additives for detergents and cleaners are bleaches, which may be present therein in an amount of up to 30% by weight. Examples of suitable bleaches are preborates or chlorine-donating compounds, such as chloroisocyanurates. Another group of additives which may, if required, be present in detergents comprises antiredeposition agents. Known substances of this type are carboxymethylcellulose, methylcellulose, hydroxypropylmethylcellulose and graft polymers of vinyl acetate with polyalkylene oxides having a molecular weight of from 1,000 to 15,000. Antiredeposition agents can be present in the detergent formulation in amounts of up to 5%. Other conventional additives for detergents, which can, if required, be present therein are optical brighteners, enzymes and perfumes. The detergent powders can also contain up to 50% by weight of a standardizing agent, such as sodium sulfate. The detergent formulations may be anhydrous or may contain small amounts, for example up to 10% by weight, of water. Liquid detergents usually contain up to 80% by weight of water. Conventional detergent formulations are described in detail in, for example, German Laid-Open Application DOS 3,514,364, whcih is hereby incorporated by reference.

The copolymers described above can all be added to detergent and cleaner formulations. The amounts used for this purpose are from 0.5 to 25, preferably from 1 to 15, % by weight, based on the total formulation. The amounts of copolymers used are in the most general cases preferably from 2 to 10% by weight, based on the detergent or cleaner mixture. Of particular importance is the use of additives to be employed according to the invention in phosphate-free and low-phosphate detergents and cleaners. The low-phosphate formulations contain not more than 25% by weight of pentasodium triphosphate or pyrophosphate. The copolymers are preferably used in phosphate-free formulations.

If desired, the copolymers to be used according to the invention can be employed in detergent formulations together with known copolymers of acrylic acid and maleic acid or homopolymers of acrylic acid. The last-mentioned polymers have been used to date as incrustation inhibitors in detergent formulations. In addition to the abovementioned polymers, copolymers of $C_3$–$C_6$-mono- and dicarboxylic acids or maleic anhydride and $C_1$–$C_4$-alkyl vinyl ethers are also suitable. The molecular weight of the homopolymers and copolymers is from 1,000 to 100,000. If desired, these incrustation inhibitors can be employed in detergents in an amount of not more than 10% by weight, based on the total formulation, in addition to the copolymers to be used according to the invention.

The copolymers can be added in the form of the free acids or in completely or partially neutralized form to the detergent formulations.

The K values stated in the Examples were determined according to H. Fikentscher, Cellulosechemie, 13 (1932), 58–64 and 71–74. $K = k \cdot 10^3$. The measurements were carried out in every case on the sodium salt in aqueous solution at 25° C., at a pH of 7 and at a concentration of the sodium salt of the polymer of 1% by weight.

EXAMPLE 1

In a glass reactor flushed with nitrogen and provided with a stirrer, 98 g of maleic anhydride in 400 ml of dioxane are heated to 100° C., and 90 g of acrylic acid, 29.7 g of butane-1,4-diol dimethacrylate, dissolved in 50 ml of dioxane, and 2.16 g of tert-butyl per-2-ethylhexanoate, dissolved in 50 ml of dioxane, are added dropwise in the course of 2 hours, starting at the same time. The reaction mixture is then stirred for 3 hours at 100° C., after which it is cooled and diluted with 800 ml of water. The solution is brought to pH 6.5 by adding 50% strength aqueous sodium hydroxide solution, the temperature being kept below 30° C. After the neutralization, a two-phase mixture is obtained. The lower phase of the mixture is separated off, dissolved in 550 ml of water and precipitated by adding 4,000 ml for 1:1 mixture of methanol and acetone. The precipitated copolymer is dried under reduced pressure at 75° C. A copolymer having a K value of 44.2 and a residual maleic acid content of 0.9% is obtained.

EXAMPLE 2

Example 1 is repeated, except that in this case 37.5 g of tripropylene glycol diacrylate are used instead of the amount of butane-1,4-diol dimethacrylate stated there. A copolymer having a K value of 69.2 and a residual maleic acid content of 0.5% is obtained.

EXAMPLE 3

In a reactor flushed with nitrogen, 98 g of maleic acid in 400 ml of dioxane are heated to 100° C., while stirring. As soon as the solution has reached the stated temperature, a mixture of 99 g of acrylic acid with 12.4 g of trimethylolpropane triacrylate, and, separately from this, a solution of 2.1 g of mercaptoethanol in 50 g of dioxane and a solution of 2.1 g of tert-butyl per-2-ethylhexanoate in 50 ml of dioxane are added dropwise starting at the same time, the first-mentioned solution being added in the course of 2 hours and the last-mentioned solution being added in the course of 2.5 hours. The reaction mixture is worked up as described in Example 1. A copolymer having a K value of 30 and a residual maleic acid content of 0.8% is obtained.

EXAMPLE 4

Example 3 is repeated, except that in this case 49 g of maleic anhydride, 136.8 g of acrylic acid and 27.3 g of the diacrylate of propylene glycol, having a molecular weight of 420, are used instead of the the mono-mers employed in Example 3. A copolymer having a K value of 59.8 and a residual maleic acid content of 0.2% is obtained.

EXAMPLE 5

Example 3 is repeated, except that in this case 49 g of maleic anhydride, 133.2 g of acrylic acid and 41.0 of the diacrylate of polypropylene glycol, having a molecular weight of 420, are used instead of the monomers employed there, and 11.2 g of thioglycollic acid are used as the regulator. A copolymer having a K value of 26.1 and a residual maleic acid content of 0.4% is obtained in this way.

EXAMPLE 6

Example 3 is repeated, except that, instead of the monomers used there, in this case 49 g of maleic anhydride, 118.6 g of acrylic acid and 95.6 g of the diacrylate of polypropylene glycol, having a molecular weight of 420, are copolymerized in the presence of 26.3 g of thioglycollic acid as a regulator. A copolymer having a K value of 39.8 and a residual maleic acid content of 0.7% is obtained.

EXAMPLE 7

In a glass reactor flushed with nitrogen and provided with a stirrer, 210 g of dioxane are initially taken and heated to 80° C. while stirring, and a solution of 98 g of acrylic acid and 21.7 g of tetraethylene glycol and a solution of 12 g of thioglycollic acid in 50 g of dioxane are added dropwise in the course of 4 hours. A solution of 2.63 g of 2,2-azobis-(2,4-dimethylvaleronitrile) in 50 ml of dioxane is metered in simultaneously with the addition of the monomers but separately from these and in the course of 4¾ hours. After the end of the addition of the initiator, the reaction mixture is stirred for a further hour at 80° C. and then cooled to room temperature. The reaction mixture is worked up by diluting it with 625 ml of water and adding sufficient 50% strength aqueous sodium hydroxide solution to bring the pH to 6.5. The polysodium salt of the copolymer is precipitated by adding 3 l of a 1:1 mixture of ethanol and acetone, and is filtered off and dried at 75° C. under reduced pressure. The copolymer has a K value of 20.9.

EXAMPLE 8

The procedure described in Example 7 is followed, except that tetrahydrofuran is used as a solvent and, instead of the monomers stated there, 100.9 g of acrylic acid are copolymerized with 14.9 g of tripropylene glycol diacrylate at 65° C. in the presence of 11.6 g of thioglycollic acid as a regulator and 2.55 g of 2,2-azobis-(2,4-dimethylvaleronitrile) as an initiator. A copolymer having a K value of 17 is obtained.

EXAMPLE 9

The procedure described in Example 7 is followed, except that tetrahydrofuran is used as a solvent and 96.7 g of acrylic acid and 15.5 g of trimethylolpropane triacrylate are used as the monomer mixture. The copolymerization is carried out at 65° C. in the presence of 11.2 g of thioglycollic acid as a regulator and 2.47 g of 2,2-azobis-(2,4-dimethylvaleronitrile) as an initiator. A copolymer having a K value of 18.6 is obtained.

EXAMPLE 10

In a glass reactor flushed with nitrogen, solutions of 76.9 g of acrylic acid and 56.3 g of tripropylene glycol diacrylate in 100 g of cyclohexanone and of 15.8 g of thioglycollic acid in 200 g of cyclohexanone are metered into a mixture of 98 g of maleic anhydride, 4.1 g of acrylic acid, 0.83 g of thioglycollic acid and 185 g of cyclohexanone at 140° C. in the course of 3 hours. A solution of 1.93 g of tert-butyl perbenzoate is added dropwise in the course of 3.5 hours, starting at the same time as these two feeds. After the end of the addition of the initiator, the reaction mixture is polymerized for a further 2 hours and then worked up as described in Example 1. A copolymer having a K value of 18.6 and a residual maleic acid content of 0.8% is obtained.

EXAMPLE 11

In a glass reactor flushed with nitrogen and provided with a stirrer, 49 g of maleic anhydride, 6.3 g of acrylic acid, 1.1 g of thioglycollic acid and 1.1 g of polyethyl vinyl ether having a K value of 50 (determined at 25° C. on a 1% strength solution in cyclohexane) in 445 g of diethyl ketone are initially taken and are heated to 100° C. while stirring. Solutions of 120 g of acrylic acid and 37.5 g of tripropylene glycol diacrylate and of 20.2 g of thioglycollic acid in 50 g of diethyl ketone are then metered into the resulting solution in the course of 3 hours, separately from one another. 2.13 g of tert-butyl per-2-ethylhexanoate, dissolved in 50 g of diethyl ketone, are added dropwise in the course of 3.5 hours, starting at the same time as these two feeds. A coarse-particled colorless suspension is obtained. The reaction mixture is stirred for a further 2 hours at 100° C. after the end of the addition of the initiator, after which it is cooled and the supernatant solvent is decanted. The solid product is washed with cold diethyl ketone and then dried at 75° C. under reduced pressure. To prepare the sodium salt of the copolymer, 75 g of the solid product are dissolved in 350 ml of water and the solution is brought to pH 6.5 with 50% strength aqueous sodium hydroxide solution. The sodium salt of the copolymer has a K value of 22.2 and a residual maleic acid content of 0.4%.

EXAMPLE 12

49 g of maleic anhydride, 117 g of acrylic acid and 56.3 g of tripropylene glycol diacrylate in diethylglycol are copolymerized in the presence of 22.2 g of thioglycollic acid as a regulator and 2.22 g of tert-butyl per-2-ethylhexanoate as an initiator, similarly to Example 11. A copolymer having a K value of 27.9 and a residual maleic acid content of 0.2% is obtained.

EXAMPLE 13

A procedure similar to that in Example 11 is followed, except that, in contrast to the stated Example, 49 g of maleic anhydride, 126 g of acrylic acid and 37.5 g of tripropylene glycol diacrylate in toluene are polymerized at 100° C. in the presence of 17.1 g of thioglycollic acid as a regulator and 2.13 g of tert-butyl per-2-ethylhexanoate as an initiator. A copolymer having a K value of 22.0 and a residual maleic acid content of 0.1% is obtained.

EXAMPLE 14

In a glass reactor equipped with a stirrer and continuously flushed with nitrogen, 308 g of toluene and 1.6 g of polyethyl vinyl ether having a K value of 50 (determined at 25° C. on a 1% strength solution in cyclohexane), as a protective colloid, are initially taken, the mixture is heated to 75° C. and a solution of 129.6 g of acrylic acid and 30 g of tripropylene glycol diacrylate and a solution of 12.77 g of thioglycollic acid in 50 ml of toluene are added continuously in the course of 4 hours, separately from one another. A solution of 1.6 g of tert-butyl per-2-ethylhexanoate in 50 g of toluene is added dropwise in the course of 4.5 hours, starting at the same time as the two stated feeds. During the copolymerization at 75° C., a finely divided suspension is formed. After the end of the addition of the initiator, the reaction mixture is stirred for a further hour at 100° C., after which it is cooled and allowed to settle out and the solvent is then decanted. The resulting finely divided copolymer is washed with toluene and dried at 75° C. under reduced pressure. To prepare the sodium salt of the copolymer, the procedure described in Example 11 is followed. The copolymer has a K value of 25.5 and a residual maleic acid content of 0.1%.

EXAMPLE 15

In a reactor provided with a stirrer, 350 g of isopropanol are initially taken under a nitrogen atmosphere and are heated to 75° C. while stirring. As soon as this temperature has been reached, a solution of 121 g of acrylic acid and 48.3 g of tetraethylene glycol diacrylate is added in the course of 4 hours and, starting at the same time but in the course of 4.5 hours, a solution of 3.39 g of 2,2-azobis-(2,4-dimethylvaleronitrile) in 50 ml of isopropanol is added. The reaction mixture is polymerized for a further 2 hours at 75° C. and then worked up as described in Example 7. A copolymer having a K value of 26.9 is obtained.

EXAMPLES 16-20

In a glass reactor having a capacity of 1 l and equipped with a stirrer, a thermometer, a condenser, a nitrogen inlet line and 2 feed vessels, 98 g (1 mole) of maleic anhydride and 0.15 mole of the polyhydric alcohol stated in each case in Table 1, in 200 ml of dioxane, are refluxed while flushing with nitrogen, until the polyhydric alcohol has been completely esterified. 108 g (1.5 moles) of acrylic acid and a solution of 2.5 g of tert-butyl per-2-ethylhexanoate in 150 ml of dioxane are then added dropwise to this solution, starting at the same time and in the course of 3 hours. After the addition is complete, the reaction mixture is polymerized for a further 2 hours at 100° C., then cooled, and brought to pH 7 by adding 50% strength aqueous sodium hydroxide solution. During the neutralization, a temperature of 25° C. should not be exceeded. The reaction mixture is worked up similarly to Example 1. The polyhydric alcohols used, the residual maleic acid content of the copolymers and the K values of the copolymers are stated in Table 1.

TABLE 1

| Example No. | Polyhydric alcohol | Residual maleic acid content | K value of the copolymer |
|---|---|---|---|
| 16 | Ethylene glycol | 0.2% | 45.2 |
| 17 | Neopentylglycol | 0.9% | 38.9 |
| 18 | Diethylene glycol | 0.3% | 47.4 |
| 19 | Polyethylene glycol | 0.4% | 54.0 |
| 20 | Butane-1,4-diol | 0.3% | 42.1 |

EXAMPLES 21-23

In a glass reactor having a capacity of 1 l and equipped with a stirrer, a thermometer, a condenser, a nitrogen inlet line and 3 feed vessels, 0.1 mole in each case of the dimaleate stated in Table 2, in 250 ml of dioxane, is initially taken. The solution is carefully flushed with nitrogen and heated to 80° C. while stirring. 94 g (1.3 mole) of acrylic acid and a solution of 10 g of thioglycollic acid in 50 ml of dioxane are then added dropwise in the course of 4 hours, while stirring constantly. A solution of 3 g of 2,2-azobis-(2,4-dimethylvaleronitrile) in 50 ml of dioxane is metered in over 5 hours, starting at the same time as the stated feeds. After the end of the addition of the initiator, the reaction mixture is polymerized for a further hour at 80° C. and worked up similarly to Example 7. The dimaleates used in each case and the K values of the copolymers are shown in Table 2.

TABLE 2

| Example No. | Dimaleate | K value |
|---|---|---|
| 21 | Ethylene glycol dimaleate | 25.8 |
| 22 | Triethylene glycol dimaleate | 28.7 |
| 23 | Butanediol maleate | 24.0 |

USE EXAMPLES

The dispersing capacity for calcium carbonate was determined by dissolving 1 g of the copolymer in 100 ml of distilled water, neutralizing the solution, if required, by adding 1M sodium hydroxide solution and adding 10 ml of 10% strength sodium carbonate solution. The solution was then titrated with 0.25M calcium acetate solution at constant pH and constant temperature until the solution became cloudy. The pH was adjusted by adding either sodium hydroxide or hydrochloric acid in dilute solution. The dispersing capacity was determined at 20° C. and pH 11, and at 80° C. and pH 10. The results are shown in Table 3.

TABLE 3

| Copolymer according to Example No. | Dispersing capacity of the copolymer [mg of $CaCO_3$/g of Na salt copolymer] at | |
|---|---|---|
| | 20° C./pH 11 | 80° C./pH 10 |
| (a) 2 | 255 | 260 |
| (b) 3 | 350 | 380 |
| (c) 4 | 260 | 260 |
| (d) 5 | 240 | 220 |
| (e) 7 | 140 | 65 |
| (f) 14 | 120 | 70 |
| (g) 19 | 290 | 250 |
| (h) 20 | 310 | 270 |

COMPARATIVE EXAMPLE

| 1 | Homopolymer of acrylic acid (K value 30) | 110 | 55 |
|---|---|---|---|
| 2 | Copolymer of acrylic acid and maleic acid Molar ratio 80:20 K value 70 | 245 | 200 |

We claim:

1. A process for the preparation of a water-soluble copolymer based on monoethylenically unsaturated carboxylic acids, having a K value of from 8 to 100 (determined on the Na salt of the copolymer according to H. Fikentscher in aqueous solution at 25° C., at a pH of 7 and at a concentration of the Na salt of the polymer of 1% by weight), by copolymerization of a monomer mixture of
    (a) from 98.5 to 18.5 mol % of one or more monoethylenically unsaturated $C_3$–$C_6$-monocarboxylic acids,
    (b) from 1.5 to 20 mol % of one or more comonomers which contain two or more ethylenically unsaturated, nonconjugated double bonds which are separated from one another by one one or more ester bonds,
    (c) from 0 to 80 mol % of one or more monoethylenically unsaturated $C_4$–$C_6$-dicarboxylic acids or anhydrides of monoethylenically unsaturated dicarboxylic acids and
    (d) from 0 to 20 mol % of other monoethylenically unsaturated comonomers which are copolymerizable with the monomers (a), (b) and (c), the sum of of the molar percentages (a) to (d) always being 100, in the presence of a polymerization initiator and a polymerization regulator in an amount of from 0.2 to 25% by weight, based on the amount of monomer, or a highly regulating solvent in an amount of not less than 20% by weight based on the monomers, at not more than 200° C., wherein the copolymerization is carried out in one or more inert organic solvents.

2. The process as claimed in claim 1, wherein the inert organic solvent used is an ether, a carboxylic ester, a hydrocarbon, a halohydrocarbon, a saturated aliphatic ketone or an alcohol.

3. The process as claimed in claim 1, wherein the copolymerization is carried out as a precipitation polymerization in a $C_1$–$C_3$-alkylbenzene, an aliphatic, acyclic C4–C8-ketone, a halo-C1–C4-alkane or a mixture of these.

4. The process as claimed in claim 1, wherein the copolymerization is carried out as a solution polymerization in dioxane, tetrahydrofuran, acetone, cyclohexanone, a monohydric C1–C4-alcohol or a mixture of these solvents, dioxane, tetrahydrofuran or a C1–C4-alcohol simultaneously being a solvent and regulator.

5. The process as claimed in claim 1, wherein the copolymerization is carried out as a suspension polymerization in one or more aliphatic hydrocarbons.

6. The process as claimed in claim 1, wherein the comonomers (b) used are obtainable by reacting
   (b1) maleic anhydride, itaconic anhydride, citraconic anhydride or a mixture of these with
   (b2) dihydric or polyhydric alcohols of 2 to 6 carbon atoms, polyalkylene glycols having a molecular weight of up to 10,000, polyglycerols having a molecular weight of up to 2,000, aminoalcohols, hydroxylamino- or hydroxydiaminocarboxylic acids, water-soluble copolymers of ethylene oxide and carbon dioxide, allyl alcohol, hydroxyalkyl esters of monoethylenically unsaturated C3–C6-carboxylic acids or of saturated C3–C6-hydroxycarboxylic acids, where the hydroxyalkyl group is of 2 to 6 carbon atoms, or mixtures of these.

7. The process as claimed in claim 1, wherein the comonomers (b) used are obtainable by esterifying
   (b3) acrylic acid, methacrylic acid, crotonic acid, vinylacetic acid or a mixture of these with
   (b2) dihydric or polyhydric alcohols of 2 to 6 carbon atoms, polyalkylene glycols having a molecular weight of up to 10,000, polyglycerols having a molecular weight of up to 2,000, aminoalcohols, hydroxyamino- or hydroxydiaminocarboxylic acids, water-soluble copolymers of ethylene oxide and carbon dioxide, allyl alcohol, hydroxyalkyl esters of monoethylenically unsaturated C3–C6-hydroxycarboxylic acids, where the hydroxyalkyl group is of 2 to 6 carbon atoms, or a mixture of these.

8. The process as claimed in claim 6, wherein some of the comonomers (b) which are obtainable by reacting (b1) with (b2) are replaced with comonomers (b) which are obtainable by reacting
   (b3) acrylic acid, methacrylic acid, crotonic acid, vinylacetic acid or a mixture of these, with (b2).

9. The process as claimed in claim 1, wherein a monomer mixture of
   (a) from 98.5 to 35 mol % of acrylic acid or methacrylic acid,
   (b) from 1.5 to 20 mol % of a diacrylate or dimethacrylate of butane-1,4-diol, polypropylene glycol having a molecular weight of from 134 to 1,016, polyethylene glycol having a molecular weight of from 106 to 6,000 or trimethylolpropane triacrylate and
   (c) from 0 to 50 mol % of maleic anhydride
in tetrahydrofuran, dioxane or a mixture of these is used.

10. The process as claimed in claim 9, wherein the comonomer (b) used is a maleic half ester which is obtainable by reacting maleic anhydride with ethylene glycol, polyethylene glycol having a molecular weight of up to 6,000, neopentylglycol or butane-1,4-diol.

11. The process of claim 1, wherein said polymerization regulator is a C1–C4-aldehyde, formic acid, ammonium formate, hydroxylammonium salts or SH-containing compounds having up to 20 carbon atoms.

12. The process of claim 11, wherein said aldehyde is formaldehyde, acetaldehyde, isobutyraldehyde, n-butyraldehyde or acrolein and said SH-containing compound is thioglycollic acid, a mercaptoalcohol, thioglycerol, C4–C20-alkylmercaptan, mercaptolactic acid, mercaptosuccinic acid and cysteine.

13. The process of claim 1, wherein said highly regulating solvent is dioxane, tetrahydrofuran, isopropanol, sec-butanol and glycerol.

* * * * *